United States Patent
Oogaki

(10) Patent No.: US 7,906,445 B2
(45) Date of Patent: Mar. 15, 2011

(54) OPTICAL GLASS AND OPTICAL ELEMENT

(75) Inventor: Akio Oogaki, Amagasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 316 days.

(21) Appl. No.: 12/156,760

(22) Filed: Jun. 4, 2008

(65) Prior Publication Data

US 2008/0305939 A1     Dec. 11, 2008

(30) Foreign Application Priority Data

Jun. 8, 2007   (JP) .................. 2007-152228

(51) Int. Cl.
  *C03C 3/21*   (2006.01)
  *C03C 3/19*   (2006.01)
  *C03C 3/16*   (2006.01)

(52) U.S. Cl. .................. 501/47; 501/46; 501/45

(58) Field of Classification Search .............. 501/45, 501/46, 47
See application file for complete search history.

(56) References Cited

U.S. PATENT DOCUMENTS

| | | | | |
|---|---|---|---|---|
| 6,875,714 | B2* | 4/2005 | Izuki .................. | 501/45 |
| 7,141,525 | B2* | 11/2006 | Yamamoto et al. ......... | 501/45 |
| 7,396,786 | B2* | 7/2008 | Miyata et al. ............ | 501/45 |
| 7,451,620 | B2* | 11/2008 | Zou et al. ............... | 65/65 |
| 7,482,293 | B2* | 1/2009 | Tsai et al. .............. | 501/46 |
| 7,531,474 | B2* | 5/2009 | Shiraishi ............... | 501/46 |
| 2002/0042337 | A1 | 4/2002 | Zou et al. | |
| 2005/0113239 | A1* | 5/2005 | Miyata et al. ........... | 501/45 |
| 2005/0164862 | A1* | 7/2005 | Shiraishi ............... | 501/45 |
| 2005/0188724 | A1* | 9/2005 | Ikenishi et al. ......... | 65/31 |
| 2006/0058171 | A1* | 3/2006 | Izuki .................. | 501/47 |
| 2006/0081010 | A1* | 4/2006 | Zou et al. .............. | 65/385 |
| 2007/0027016 | A1* | 2/2007 | Ogino et al. ............ | 501/45 |
| 2008/0032879 | A1* | 2/2008 | Tsai et al. ............. | 501/42 |

FOREIGN PATENT DOCUMENTS

| JP | 2005-008518 | | 1/2005 |
|---|---|---|---|
| JP | 2007015904 | A * | 1/2007 |

\* cited by examiner

*Primary Examiner* — Karl E Group
*Assistant Examiner* — Elizabeth A Bolden
(74) *Attorney, Agent, or Firm* — Brinks Hofer Gilson & Lione

(57) ABSTRACT

An optical glass includes $P_2O_5$, $B_2O_3$, $Li_2O$, $Na_2O$, $K_2O$, $CaO$, $TiO_2$, $Bi_2O_3$, $Nb_2O_5$ and $WO_3$ each of which is in an amount in a predetermined range.

12 Claims, No Drawings

OPTICAL GLASS AND OPTICAL ELEMENT

This application is based on Japanese Patent Application No. 2007-152228 filed on Jun. 8, 2007, in Japanese Patent Office, the entire content of which is hereby incorporated by reference.

TECHNICAL FIELD

The present invention relates to optical glass and an optical element comprising the optical glass, and more particularly relates to optical glass suitable for press molding and an optical element comprising the optical glass.

BACKGROUND

A manufacturing method of an optical element such as a glass lens, a so-called press molding method, has come to be widely employed in recent years. The press molding method directly conducts molding of an optical element by pressing glass heated at not lower than the deformation temperature ($A_t$) by use of a molding die including a heated pair of an upper mold and an lower mold. The method needs fewer manufacturing processes to be capable of manufacturing an optical element in a shorter time and at a lower cost compared to a conventional molding method to grind glass. Therefore, it has come to be widely employed as a manufacturing method of an optical element in recent years.

This press molding method can be roughly classified into a reheating method and a direct press method. A reheating method is a method, in which, after a gobpreform or a ground preform having a nearly final product form is prepared, these preforms are reheated at over the softening point followed by being pressed and molded by a pair of heated upper and lower molds to prepare a final product form. On the other hand, a direct press method is a method, in which molten glass drops are directly added drop-wise on a heated die from a glass melting furnace and are press-molded to prepare a final product form. In either of these press molding methods, it is necessary to heat a press die at a temperature neighboring or higher than a glass transition temperature ($T_g$) when glass is molded. Therefore, the higher is a glass transition temperature ($T_g$), the more easily caused is surface oxidation of a press molding die or variation of a metal composition to shorten a life of a molding die, resulting in an increased cost of manufacturing. Although deterioration of a molding die can be restrained by conducting molding under an inert gas atmosphere such as nitrogen, a manufacturing cost is increased because a molding system may become complicated to control the atmosphere and a running cost of an inert gas is also required. Therefore, glass utilized in a press molding method is preferably has a glass transition temperature ($T_g$) as low as possible.

Further, a nozzle comprising a material such as platinum is generally employed to drop molten glass drops. The weigh of glass added drop-wise is controlled by this nozzle temperature. In glass having a low liquid phase temperature ($T_L$), since nozzle temperature can be set in a wide temperature range from high temperature to low temperature, it is possible to prepare an optical element of various size from large one to small one. On the other hand, in the case of glass having a high liquid phase temperature ($T_L$), there is a problem that stable drop-wise addition is difficult since glass may be devitrified unless nozzle temperature is kept at not lower than a liquid phase temperature ($T_L$) Further, in the case of glass having a high liquid phase temperature ($T_L$), reactivity with a molding die will increase resulting in a problem of shortened life time of a molding die since temperature of glass added drop-wise itself becomes high.

Herein, in consideration of a working environment, it is desirable not to use a lead compound, an arsenic compound and a fluorine compound. Various technologies, which lower a glass transition temperature ($T_g$) and a liquid phase temperature ($T_L$) without employing these compounds, have been studied and proposed, as disclosed in, for example, patent documents of US2002/042337 and JP-A 2005-8518 (hereinafter, JP-A refers to Japanese Patent Publication Open to Public Inspection No.).

However some of optical glass shown in the above patent documents has a glass transition temperature ($T_g$) of not higher than 520° C., the liquid phase temperature ($T_L$) is not satisfactorily low. Since a liquid phase temperature ($T_L$) of the optical glass is not so low, the glass will be devitrified in a nozzle to induce nozzle clogging like hardening of the arteries. As a result, there is a problem that stable drop-wise addition and press molding of glass are difficult.

In view of such a problem, it is desired to provide optical glass of high productivity having predetermined optical constants without including compounds such as lead compound and arsenide.

SUMMARY

An optical glass comprises, based on a total weight of the optical glass: 12 to 30 weight percent of $P_2O_5$; 1 to 5 weight percent of $B_2O_3$; 1 to 8 weight percent of $Li_2O$; 0.5 to 10 weight percent of $Na_2O$; 0.5 to 15 weight percent of $K_2O$; 1 to 5 weight percent of CaO; 0 to 20 weight percent of BaO; 0 to 5 weight percent of SrO; 1 to 10 weight percent of $TiO_2$; 1 to 20 weight percent of $Bi_2O_3$; 3 to 35 weight percent of $Nb_2O_5$; 13 to 60 weight percent of $WO_3$; and 0 to 1 weight percent of $Sb_2O_3$, wherein a total weight of $Na_2O$ and $K_2O$ is in a range of 3 to 20 weight percent based on the total weight of the optical glass.

Objects, features and advantages according to the present invention will become more apparent upon reading of the following detailed description.

DESCRIPTION OF THE PREFERRED EMBODIMENT

The inventor of this invention, as a result of extensive study, has found that optical glass including $P_2O_5$, $B_2O_3$, $Li_2O$, $Na_2O$, $K_2O$, CaO, $TiO_2$, $Bi_2O_3$, $Nb_2O_5$ and $WO_3$ as an essential component each of which is in an amount in a predetermined range, has a low glass transition temperature ($T_g$) suitable for press molding and a low liquid phase temperature ($T_L$) to provide a good dropping property of molten glass drops while keeping predetermined optical constants; and this invention has been achieved.

That is, optical glass for press molding includes glass components of 12-30% $P_2O_5$, 1-5% $B_2O_3$, 1-86 $Li_2O$, 0.5-10% $Na_2O$, 0.5-15% $K_2O$, 1-5% CaO, 0-20% BaO, 0-5% SrO, 1-10% $TiO_2$, 1-20% $Bi_2O_3$, 3-35% $Nb_2O_5$, 13-60% $WO_3$ and 0-1% $Sb_2O_3$, in weight % based on the total weight of the optical glass. In the components, the total weight of $Na_2O$ and $K_2O$ is in a range of 3-20 weight %, based on the total weight of the optical glass. Hereinafter, "%" means "weight percent based on a total weight of the optical glass" unless otherwise mentioned.

Herein, the optical lens preferably has constants of a refractive index (nd) in a range of 1.80-1.85; an Abbe number (vd) in a range of 20-28.5; a glass transition temperature ($T_g$)

which is not higher than 520° C.; and a liquid phase temperature ($T_L$) which is not higher than 700° C.

Further, an optical element comprising the aforesaid optical glass can be provided as an embodiment of the present invention. A lens, a prism and a mirror are preferable as such an optical element.

Further, an optical element such as a lens comprising the aforesaid optical glass formed by press molding can be provided as an embodiment of the present invention.

By providing optical glass containing predetermined glass components in predetermined amount, the optical glass can achieve optical constants of a high refractive index and/or a high dispersion without utilizing compounds such as lead and arsenic which may provide bad influence on a human body, and can achieve a low glass transition temperature ($T_g$) to be excellent in a press molding property and a low liquid phase temperature ($T_L$) to be excellent in dropping property of a molten glass drop.

An optical element including optical glass formed by press molding, can have characteristics of the aforesaid optical glass and have high productivity to achieve a low cost.

The reason why each component of the optical glass is defined to those described above will be explained below.

First, $P_2O_5$ is glass forming oxide and glass is liable to be devitrified when the content is less than 12%. On the other hand, a refractive index (nd) is decreased when the content of $P_2O_5$ is over 30%. To solve the problems, the content of $P_2O_5$ is defined to be in a range of 12-30%. The content is more preferably in a range of 13-28%.

$B_2O_3$ is an essential component of the optical glass and has an effect to lower a liquid phase temperature ($T_L$). An effect to lower a liquid phase temperature ($T_L$) is not sufficient when the content of $B_2O_3$ is less than 1%. On the other hand, glass becomes highly viscous which is not preferable for dropping of molten glass drops when the content of $B_2O_3$ is over 5%. To solve the problems, the content of $B_2O_3$ is defined to be in a range of 1-5%. The content is more preferably in a range of 1.5-3.0%.

$LiO_3$ is an essential component of the optical glass and has a large effect to lower a glass transition temperature ($T_g$). The aforesaid effect is not sufficient when the content of $Li_2O$ is less than 1%. On the other hand, glass becomes unstable when the content of $Li_2O$ is over 8%. To solve the problems, the content of $Li_2O$ is defined to be in a range of 1-8%. The content is more preferably in a range of 2.0-6.0%.

Further, $Na_2O$ and $K_2O$ each are essential components of the optical glass and has an effect to lower a glass transition temperature ($T_g$). The aforesaid effect is not obtained sufficiently when the content of $Na_2O$ is less than 0.5%. On the other hand, it is difficult to maintain the refractive index when the content of $Na_2O$ is over 10%. To solve the problems, the content of $Na_2O$ is defined to be in a range of 0.5-10%. The content is more preferably in a range of 1.0-8.0%. The aforesaid effect is not obtained sufficiently when the content of $K_2O$ is less than 0.5%. On the other hand, it is difficult to maintain the refractive index when the content of $K_2O$ is over 15%. To solve the problems, the content of $K_2O$ is defined to be in a range of 0.5-15%. The content is more preferably in a range of 1.0-6.0%.

Further, an effect to lower a glass transition temperature ($T_g$) is not sufficient when the total amount of $Na_2O$ and $K_2O$ is less than 3%. On the other hand, stability of glass will be deteriorated when the total amount of $Na_2O$ and $K_2O$ is over 20%. To solve the problems, the total amount of $Na_2O$ and $K_2O$ is defined to be in a range of 3-20%. The total amount of $Na_2O$ and $K_2O$ is more preferably in a range of 4-12%.

CaO has an effect to increase a refractive index (nd) and to lower a liquid phase temperature ($T_L$). The aforesaid effect is not obtained sufficiently when the content of CaO is less than 1%. On the other hand, glass becomes unstable when the content of $Ca_2O$ is over 5%. To solve the problems, the content of CaO is defined to be in a range of 1-5%. The content is more preferably in a range of 1.5-4.5%.

BaO is useful for adjustment of a refractive index (nd), however, a glass transition temperature becomes high when the content of BaO becomes high. To solve the problem, the content of BaO is defined to be in a range of 0-20%. The content is more preferably in a range of 0-12%.

SrO is also useful for adjustment of a refractive index (nd), however, a glass transition temperature becomes high when the content of SrO becomes high. To solve the problem, the content of SrO is defined to be in a range of 0-5%.

$TiO_2$ has an effect to increase a refractive index (nd) and to lower a liquid phase temperature ($T_L$). The aforesaid effect is not obtained sufficiently when the content of $TiO_2$ is less than 1%. On the other hand, glass is liable to be tinted when the content of $TiO_2$ is over 10%. To solve the problems, the content of $TiO_2$ is defined to be in a range of 1-10%. The content is more preferably in a range of 1.5-8.0%.

$Bi_2O_3$ has an effect to lower a glass transition temperature ($T_g$) and a liquid phase temperature ($T_L$). The aforesaid effect is not obtained sufficiently when the content of $Bi_2O_3$ is less than 1%. On the other hand, glass is liable to be tinted when the content of $Bi_2O_3$ is over 20%. To solve the problems, the content of $Bi_2O_3$ is defined to be in a range of 1-20%. The content is more preferably in a range of 1.5-10%.

$Nb_2O_5$ has an effect to increase a refractive index (nd) and to enhance durability of glass. The aforesaid effect is not obtained sufficiently when the content of $Nb_2O_5$ is less than 3%. On the other hand, a liquid phase temperature ($T_L$) is raised when the content of $Nb_2O_5$ is over 35%. To solve the problems, the content of $Nb_2O_5$ is defined to be in a range of 3-35%. The content is more preferably in a range of 5.0-32%.

$WO_3$ has an effect to make glass to have a high refractive index (nd) and a high dispersion (vd) without raising a glass transition temperature ($T_g$) as much as $Nb_2O_5$. The aforesaid effect is not obtained sufficiently when the content of $WO_3$ is less than 13%. On the other hand, glass is liable to be tinted when the content of $WO_3$ is over 60%. To solve the problems, the content of $WO_3$ is defined to be in a range of 13-60%. The content is more preferably in a range of 15-54%.

$Sb_2O_3$ has an effect to improve a clarifying action by addition of a small amount. Therefore, the content of $Sb_2O_3$ is defined in a range of 0-1%.

An embodiment of the present invention is an optical element comprising the aforesaid optical glass formed by press molding. This press molding method includes a direct press molding method and a reheating molding method. In the direct press molding method, molten glass is added dropwise into a molding die heated at a predetermined temperature from a nozzle to be pressing molded. In the reheating molding method, a preform material is mounted on a molding die and heated at not lower than a glass softening point to be pressing molded. These methods require no polishing and grinding processes resulting in improved productivity, and an optical element having a form difficult to be processed such as a free curved surface and an aspherical surface can be prepared.

A molding condition differs depending on factors such as a glass composition and a form of a molded product. Generally, the temperature of a molding die is preferably in a range of 350-600° C. and specifically preferably in a temperature range near to a glass transition temperature. A press time duration is preferably from a few seconds to a few tens seconds. Further, a press pressure is preferably in a range of 20-60 MPa depending on the form and size of a lens, and highly precise molding is possible when the press pressure is the higher.

An optical element as an embodiment of the prevent invention can be utilized as a lens of a digital camera, a collimator lens, a prism and a mirror of a laser beam printer.

EXAMPLES

In the following, this invention will be more specifically explained referring to examples. Herein, this invention is not limited to these examples.

Examples 1-10, Comparative Examples 11-13:

By use of general glass raw materials such as an oxide raw material, carbonate salt and nitrate salt, starting materials of glass were prepared so as to make aimed compositions shown in Table 1, and were sufficiently mixed as powder to prepare a mother material. This was charged into a fusing furnace heated at 1,000-1,300° C., being mixed to be homogeneous after having being melt and clarified, being cast in a cast die made of iron or carbon having been heated in advance, and the resulting product was gradually cooled, whereby each sample was prepared. With respect to these each samples, a refractive index (nd) and an Abbe number (vd) for d-line; a glass transition temperature ($T_g$); a glass deformation temperature ($A_t$) and a liquid phase temperature ($T_L$) were measured respectively. The measurement results of examples 1-10 and comparative examples 11-13 will be summarized in Table 1.

Herein, comparative example 11 is a supplementary examination of example 50 of US2002/042337, comparative example 12 is that of example 11 of JP-A 2005-8518, and comparative example 13 is that of example 78 of US2002/042337, respectively.

The measurement of the above-described physical properties was conducted based on a test method of Japan Optical Glass Industrial Standard (JOGIS). That is, a refractive index (nd) and an Abbe number (vd) are values when a sample is gradually cooled at −50° C./hour. The measurement was conducted by use of "KPR-200" manufactured by Kalnew Optical Industries Co., Ltd.

Measurement of a glass transition temperature ($T_g$) and a glass deformation temperature ($A_t$) was conducted by use of Thermo-mechanical Analyzer "TMA/SS6000" manufactured by Seiko Instruments Co., Ltd. under a temperature raising condition of 10° C./minute.

In measurement of a liquid phase temperature ($T_L$), after holding molten glass have been flown into a cast die for one hour, glass was cooled to room temperature; and the glass interior was observed by use an optical microscope "BX50" manufactured by Olympus Corp. at a magnification of 40 times. A temperature at which no devitrification (crystals) is confirmed was defined as a liquid phase temperature ($T_L$).

TABLE 1

| | | Examples | | | | | | | | | | Comparative Examples | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Component (weight %) | $P_2O_5$ | 24.50 | 24.50 | 25.80 | 24.50 | 24.60 | 24.50 | 15.00 | 25.90 | 24.50 | 21.20 | 14.90 | 13.40 | 26.30 |
| | $B_2O_3$ | 2.00 | 2.00 | 2.00 | 2.00 | 2.00 | 2.00 | 1.70 | 2.00 | 2.00 | 1.90 | 1.80 | 1.00 | 1.60 |
| | $Li_2O$ | 3.30 | 3.80 | 3.30 | 3.80 | 3.80 | 3.80 | 2.70 | 5.30 | 3.30 | 3.40 | 2.70 | — | 5.10 |
| | $Na_2O$ | 5.50 | 5.50 | 5.50 | 5.50 | 5.50 | 5.50 | 4.00 | 0.50 | 5.50 | 5.00 | 3.60 | 10.80 | 5.30 |
| | $K_2O$ | 1.00 | 4.30 | 1.00 | 3.30 | 0.50 | 0.80 | 1.00 | 4.00 | 1.00 | 3.10 | 1.40 | — | 1.50 |
| | CaO | 2.00 | 1.50 | 2.00 | 2.00 | 1.80 | 3.10 | 1.60 | 4.50 | 2.40 | 1.50 | — | — | — |
| | BaO | 9.50 | — | 9.50 | — | 9.20 | 9.10 | 10.70 | 7.00 | 8.80 | 3.70 | 14.70 | 8.00 | 3.50 |
| | SrO | — | — | — | — | — | — | — | — | 0.30 | — | — | 3.00 | — |
| | $TiO_2$ | 3.90 | 2.90 | 6.40 | 2.40 | 1.90 | 3.20 | 2.40 | 3.90 | 4.50 | 2.60 | — | 4.50 | 3.70 |
| | $Bi_2O_3$ | 2.95 | 2.80 | 2.90 | 9.70 | 3.60 | 3.20 | 1.88 | 2.70 | 2.40 | 2.50 | — | — | — |
| | $Nb_2O_5$ | 27.80 | 30.80 | 24.00 | 30.80 | 31.20 | 29.00 | 5.20 | 27.30 | 26.70 | 21.80 | 5.20 | 12.60 | 36.90 |
| | $WO_3$ | 17.50 | 21.87 | 17.60 | 16.00 | 15.90 | 15.80 | 53.80 | 16.90 | 18.60 | 33.10 | 55.70 | 38.70 | 14.30 |
| | $Sb_2O_3$ | 0.05 | 0.03 | — | — | — | — | 0.02 | — | — | — | — | — | — |
| | $GeO_2$ | — | — | — | — | — | — | — | — | — | — | — | 8.00 | — |
| | ZnO | — | — | — | — | — | — | — | — | — | — | — | — | 1.90 |
| $Na_2O + K_2O$ | | 6.50 | 9.80 | 6.50 | 8.80 | 6.00 | 6.30 | 5.00 | 4.50 | 6.50 | 8.10 | — | — | — |
| Refractive index ($n_d$) | | 1.816 | 1.813 | 1.814 | 1.823 | 1.813 | 1.807 | 1.830 | 1.805 | 1.817 | 1.819 | 1.804 | 1.802 | 1.821 |
| Abbe number ($v_d$) | | 25.2 | 24.1 | 24.8 | 24.0 | 25.7 | 26.1 | 25.7 | 27.3 | 24.9 | 24.7 | 27.95 | 24.76 | 24.0 |
| Glass transition temperature $T_g$ (° C.) | | 473 | 468 | 480 | 456 | 472 | 470 | 443 | 469 | 477 | 459 | 448 | 487 | 467 |
| Deformation temperature $A_t$ (° C.) | | 536 | 521 | 541 | 511 | 530 | 526 | 487 | 526 | 533 | 518 | 485 | 515 | 513 |
| Liquid phase temperature $T_L$ (° C.) | | 670 | 660 | 670 | 680 | 690 | 670 | 680 | 690 | 690 | 670 | 747 | 780 | 900 |

As be seen from Table 1, optical glass of examples 1-10 had a high refractive index and/or a high dispersion, a glass transition temperature ($T_g$) of not higher than 520° C. and a liquid phase temperature ($T_L$) as low as not higher than 700° C., resulting in being excellent in a press molding behavior and a dropping property of molten glass drops. Contrary, comparative examples 11-13 had a liquid phase temperature ($T_L$) of not lower than 700° C. not to fit dropwise addition of molten glass, resulting in low productivity.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical glass comprising, based on a total weight of the optical glass:
12 to 30 weight percent of $P_2O_5$;
1 to 5 weight percent of $B_2O_3$;
1 to 8 weight percent of $Li_2O$;
0.5 to 10 weight percent of $Na_2O$;
0.5 to 15 weight percent of $K_2O$;
1 to 5 weight percent of CaO;
0 to 20 weight percent of BaO;
0 to 5 weight percent of SrO;
1 to 10 weight percent of $TiO_2$;
1 to 20 weight percent of $Bi_2O_3$;
5.0 to 32 weight percent of $Nb_2O_5$;
13 to 60 weight percent of $WO_3$; and
0 to 1 weight percent of $Sb_2O_3$, wherein a total weight of $Na_2O$ and $K_2O$ is in a range of 3 to 20 weight percent based on the total weight of the optical glass and wherein said optical glass has: a refractive index (nd) in a range of 1.80 to 1.85, an Abbe number (vd) in a range of 20 to 28.5, a glass transition temperature (Tg) not higher than 520° C., and a liquid phase temperature (TL) not higher than 700° C.

2. The optical glass of claim 1, wherein the optical glass is formed to have a structure so as to be an optical element selected from the group consisting of a lens, a collimator lens, a prism and a mirror.

3. The optical glass of claim 1, wherein the optical glass is formed by press molding and is formed to have a structure so as to be an optical element selected from the group consisting of a lens, a collimator lens, a prism and a mirror.

4. The optical glass of claim 1, wherein the optical glass comprises 2.4 to 10 weight percent of $TiO_2$, based on the total weight of the optical glass.

5. The optical glass of claim 1, wherein:
the weight percent of $P_2O_5$ is less than 20;
the weight percent of $B_2O_3$ is less than 3;
the weight percent of $Bi_2O_3$ is less than or equal to 3; and
the weight percent of $Nb_2O_5$ is less than 25.

6. The optical glass of claim 1, wherein:
the weight percent of $WO_3$ is greater than or equal to 21 and less than or equal to 60.

7. The optical glass of claim 2, wherein the optical glass comprises 2.4 to 10 weight percent of $TiO_2$, based on the total weight of the optical glass.

8. The optical glass of claim 2, wherein:
the weight percent of $P_2O_5$ is less than 20;
the weight percent of $B_2O_3$ is less than 3;
the weight percent of $Bi_2O_3$ is less than or equal to 3; and
the weight percent of $Nb_2O_5$ is less than 25.

9. The optical glass of claim 2, wherein:
the weight percent of $WO_3$ is greater than or equal to 21 and less than or equal to 60.

10. The optical glass of claim 3, wherein the optical glass comprises 2.4 to 10 weight percent of $TiO_2$, based on the total weight of the optical glass.

11. The optical glass of claim 3, wherein:
the weight percent of $P_2O_5$ is less than 20;
the weight percent of $B_2O_3$ is less than 3;
the weight percent of $Bi_2O_3$ is less than or equal to 3; and
the weight percent of $Nb_2O_5$ is less than 25.

12. The optical glass of claim 3, wherein:
the weight percent of $WO_3$ is greater than or equal to 21 and less than or equal to 60.

* * * * *